Nov. 17, 1942.  J. A. CAMPBELL, JR  2,302,185
ELECTRIFIED SPRAY APPARATUS
Filed July 27, 1940
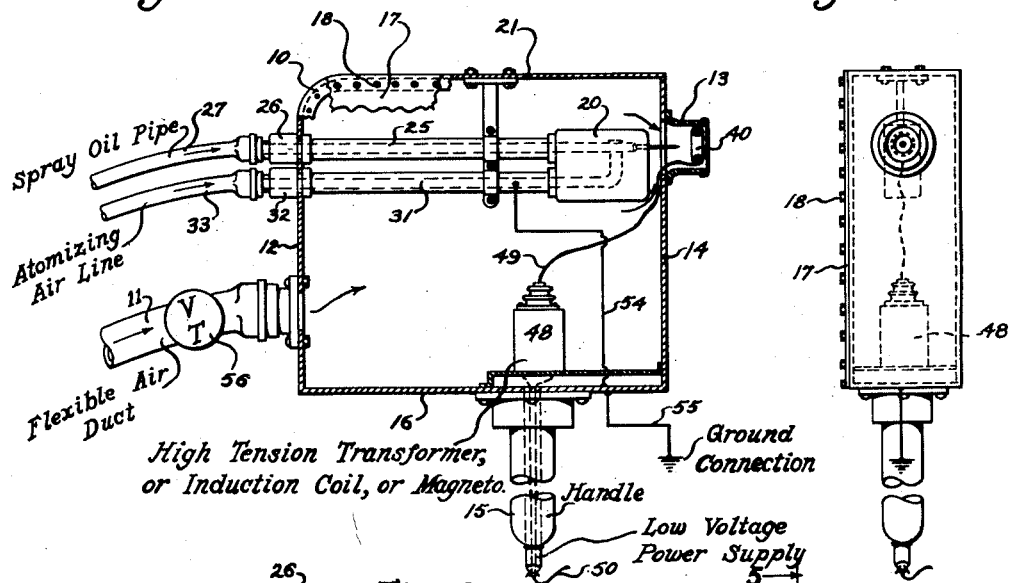
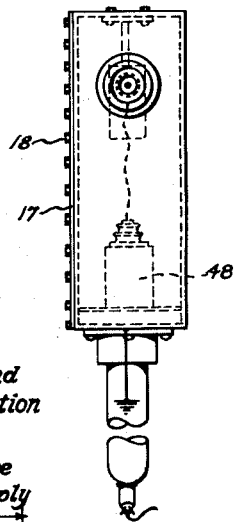
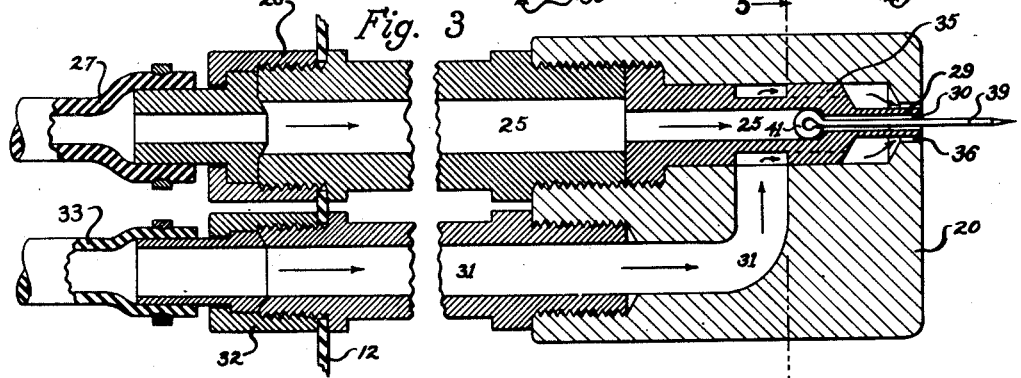
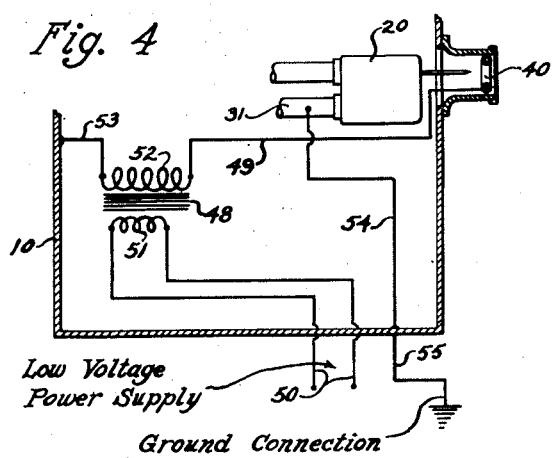
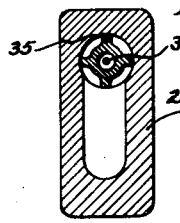
INVENTOR
Joseph A. Campbell, Jr.
BY
Ross J. Garofalo
ATTORNEY Patented Nov. 17, 1942

2,302,185

UNITED STATES PATENT OFFICE 2,302,185

ELECTRIFIED SPRAY APPARATUS

Joseph A. Campbell, Jr., Los Angeles, Calif., assignor to Union Oil Company of California, Los Angeles, Calif., a corporation of California Application July 27, 1940, Serial No. 347,897

4 Claims. (Cl. 299—1)

This invention relates to liquid sprayers and particularly to sprayers for the application of insecticidal and fungicidal oils to plants.

In the conventional method of applying such oils to plants an emulsion of the oil in water is usually made and the emulsion sprayed upon the plants with the result that upon evaporation of the water, the oil is left in the form of an extremely thin film of fairly uniform thickness and distribution.

However, the employment of water as a carrier for the spray is not always desirable or permissible. For example, in pest control in deciduous fruit growing areas such as the Pacific Northwest, the freezing temperatures occasionally encountered during the spraying season would, if immediately following the application of a water emulsion, result in severe damage to the trees. Also, in certain locations sufficient water for the preparation of a spray oil emulsion is not always available at the required time.

The efficient and effective application of spray oils to plants, particularly, trees, by mechanical atomization of the spray oil alone without a water carrier, has heretofore presented several difficulties. When sufficient high velocities of the atomized liquid are employed to effectively reach the higher and more distant branches of trees, the velocity is such that the liquid particles tend to stream around the branches rather than to impinge upon them. When low velocity atomization is employed, the higher limbs of trees cannot be effectively reached without over-application on the lower branches. It has also been found that the oil, even if finely atomized, quickly coalesces to form larger droplets which are unsuited to accomplishing an even distribution of the spray oil upon the plant surfaces and that, in all events, a substantial proportion of the spray fails to impinge upon any part of the plant or tree and is thus wasted.

It is, therefore, an object of this invention to present an apparatus for the efficient and effective application of oils to plants or other surfaces and to accomplish the same preferably without employing extraneous carrier liquids.

The invention resides broadly in an apparatus for the atomization of spray liquids in the presence of an intense electric field whereby the resultant cloud of atomized liquid spray particles is electrified and causing said electrified atomized spray to deposit on the surfaces to be sprayed under the influence of an electric field.

Other objects and features of the invention will be evident from the following description of the invention particularly as taken from the drawing.

Referring to the drawing which illustrates one preferred embodiment of the invention, Fig. 1 is a side sectional elevation of the spray generating apparatus. Figure 2 is a front elevation of the apparatus of Figure 1. Figure 3 is a cross-sectional detail of the spray nozzle. Figure 4 is a wiring diagram of the electrical elements of the apparatus. Figure 5 is a cross-section of the spray nozzle taken on lines 5—5 of Figure 3.

The apparatus of the invention is as follows:

The body of this apparatus, as shown in Figures 1 and 2, comprises a substantially rectangular metal body or container 10 having an air inlet duct 11, attached at the lower rear end 12, an air and spray outlet nozzle 13 projecting forward from the upper end 14, and a handle 15 extending downward from the bottom 16 thereof. The outlet nozzle 13 is made of non-conducting material. A removable side cover plate 17 adapted to allow ready access to the interior of the sprayer body container 10 is held in place by means of a plurality of studs as shown at 18.

On the interior of the enclosure 10, a spray nozzle 20 shown in enlarged detail in Figure 3, is supported from the inside back 12 and top 21 extending into and coaxial with the outlet nozzle 13.

The spray nozzle 20, which is shown in cross-sectional detail of Figure 3, comprises a metal tube 25 terminating at the rear end in a connection 26 through which spray liquid is adapted to be supplied from the attached flexible tubing 27 and terminating at the forward end in an inner spray head 29 having an oil supply orifice 30 of reduced diameter. The nozzle 20 also comprises another metal tube 31 terminating at the rear end in a connection 32 through which atomizing air is adapted to be supplied from the attached flexible tubing 33 and terminating near the forward end by means of a perforate spider 35 best shown in section in Figure 5. The tube 31 terminates at the forward end in an annular orifice 36 of reduced diameter. Extending coaxially throughout a portion of the length of the tube 25 and passing out through the orifices 30 is a pointed metal rod electrode 39. The rod electrode is prevented from being withdrawn through the orifice 30 by providing it with a loop 41 of larger diameter than the diameter of the orifice 30. As stated before, spray liquid is adapted to be supplied to the inner spray head 29 through the inner tubing 25, flexible pipe 27 and connection 26, and also atomizing air or other suitable fluid under pressure is adapted to be supplied to the nozzle spray head 36 through a flexible pipe 33, connection 32 and through the tube 31.

The spray outlet nozzle 13 is provided with a circular glass covered electrode 40 which preferably is such diameter as to be housed in the nozzle 13. The metal portion of the electrode 40 is spaced from the terminal point 39 in such manner that it lies forward from a plane perpendicular to the axis of the pointed electrode 39 at its forward end. Preferably, the electrode 40 is spaced some distance in the vertical plane away from the point of the electrode 39 so as to avoid interference with the oil spray.

Also enclosed within the body 10, as shown in Figure 1, the wiring diagram of which is shown in Figure 4 is a high tension transformer 48 connected to supply by an insulated wire 49 a high tension electric potential between the central pointed electrode 39 and the glass covered electrode 40. An induction coil or magneto can be substituted for the high tension transformer.

Referring particularly to the wiring diagram of Figure 4, the primary 51 of the transformer 48 is connected to insulated electrical conductors 50 which serve to carry the low tension current supply thereto and which enter the sprayer enclosure 10 through a conduit provided through the center of the handle 15. The secondary 52 of the high tension transformer 48 is connected at one end to the metal sprayer body 10 at 53 and at the other end to the metal portion of the electrode 40 by means of the insulated wire 49. The said body 10 being a conductor, the electrical circuit is completed therethrough to the nozzle 20 and the pointed electrode 39. The arrangement and connections thus shown provide an electric circuit to impose a high tension electric potential between the pointed electrode 39 and the spaced electrode 40. This potential causes electrification of the oil spray issuing from the spray nozzle 20.

The body 10 of the sprayer is connected to a suitable grounded terminal by way of a flexible insulated conductor 55.

Flexible pipe 27 and flexible line 33 serve to supply spray-liquid and air, respectively, to the pipes 25 and 31 which lead to the before described spray nozzle 20. The air duct 11 serves to supply air under pressure from a suitable blower to the sprayer body 10 through which it passes to the outer nozzle 13 for the purpose of providing a secondary volume of air to carry the atomized oil from the nozzle in the event that the atmospheric air currents are insufficient to accomplish this purpose.

The operation of the apparatus is as follows:

With the high potential supply set in operation a high tension electric potential is maintained between the nozzle electrode assembly 20, 39 and the outer glass covered electrode 40, preferably of sufficient gradient to produce a silent electric discharge or a corona discharge from the electrode 39. Spray liquid and air may then be supplied through the spray oil pipe 27 and the atomizing air line 33, respectively, to the nozzle assembly 20. The spray liquid passes therefrom through the inner tube 25 and issues from the orifice 30 in the nozzle head 29. High pressure air passes through tube 31 to the constructed annular orifice 36 and issues in a high velocity stream and contacts and atomizes the oil issuing through orifice 30.

As the thus formed stream of the air and atomized spray liquid mixture passes outward along the length of the rod electrode 39, it is subjected to the ionizing effect of the corona discharge from the said rod electrode whereby the finely divided liquid particles comprising the said atomized spray are each imparted electrical charges of like polarity. The effect of this charged state of the atomized liquid-air mixture is twofold. First, the thus formed charged liquid spray particles, in effect tend to repel one another and thus resist coalescence, with the result that the thus produced electrified cloud of atomized spray liquid persists for a longer period of time, affording thereby better opportunity for its more uniform and effective contact with surfaces to be coated. Second, the said atomized liquid spray particles, being electrically charged move toward and precipitate in a layer upon all the surfaces of grounded objects in a unique way so that when the liquid spray is properly applied with respect to air current velocities, the surfaces facing away from the direction of origin of the charged spray cloud will be wetted by the precipitated spray liquid to the same or nearly the same degree as the nearer surfaces. The precipitation of the spray liquid on these rearward surfaces is the resultant of two opposing tendencies, namely air currents tending to carry the spray particle away from the rearward surface and the electrical charge tending to precipitate the spray particle. For the proper application of the electrified spray where it is desired to wet both the forward and rearward surfaces of an object, it is necessary to so adjust the air currents that they do not nullify the electrical attractive forces to the rearward surfaces. The adjustment of the secondary air current can be determined by an inspection of the surface to be sprayed, noting whether both the forward and rearward surfaces are being coated with the spray liquid. It will be understood that the adjustment will vary with the local atmospheric conditions surrounding the object to be sprayed.

Thus, for example, an electrified cloud of atomized spray liquid carrying a charge as produced in the above described manner and directed toward the branches and leaves of a grounded plant or tree will be attracted to all surfaces of the branches and leaves and quickly precipitated thereon in the form of a thin uniformly distributed film of liquid, providing the air current velocities near said branches and leaves are low enough not to overcome the electrical attraction.

When it is desirable or necessary to project the atomized spray liquid cloud for a considerable distance, this is more effectively accomplished by supplying a relatively large volume of air under suitable pressure through the flexible air duct 11 to the sprayer body 10, from which it flows through the outer nozzle 13 around the spray nozzle assembly 20 and issues from the forward end of the outer nozzle 13 in the form of a stream of air of sufficient velocity to carry the atomized spray-liquid cloud to a greater distance than would be possible when relying upon the velocity of the atomized spray-liquid alone. This provision for projecting the atomized spray liquid cloud in a carrier stream of air is particularly advantageous when it is necessary to reach distant or high tree branches. The volume of this secondary air must be properly adjusted by valve 56 to keep the velocity of the spray cloud at the spray objective low enough so that the electrical force tending to precipitate the spray liquid on the rearward surfaces is not overcome by the mechanical force of the air stream.

Electric potentials maintained between the nozzle electrode assembly 20—39 and the glass covered electrode 40, which are effective in giving the atomized spray oil droplets sufficient charge to minimize coalescence until they contact the leaves and limbs of the plant or tree being sprayed, may range from 10,000 to 25,000 volts. When employing these voltages, the sprayer apparatus may be equipped with the glass covered electrode having an inner diameter of approximately 3/4 inch.

The spray employed may be a liquid, or finely ground solid such as a dust, or a suspension of a solid in a liquid or an emulsion of one liquid in another liquid. The spray may be a paraffinic or aromatic oil, for example, an aromatic type of oil having a viscosity of approximately 50 seconds Saybolt at 100° F. Such an oil can be readily atomized and is of sufficient viscosity, particularly at the lower temperature encountered in the spraying seasons, to prevent substantial drainage from the leaves and branches.

The foregoing is merely illustrative of a preferred method and embodiment of the invention and is not to be considered limiting since many variations may be made by those skilled in the art within the scope of the appended claims.

I claim:

1. Coating apparatus comprising in combination an atomizing nozzle means to supply coating material to be finely divided to said atomizing nozzle, means to supply an atomizing gas to said atomizing nozzle, an electrode, a second electrode spaced forward from said first named electrode, means to maintain a corona discharge at the termination of said first named electrode, and means to pass atomized coating material through said corona discharge.

2. An apparatus according to claim 1 in which the first named electrode consists of a pointed rod.

3. Coating apparatus comprising in combination an atomizing nozzle means to supply coating material to be finely divided to said atomizing nozzle, means to supply an atomizing gas to said atomizing nozzle, an electrode, a second electrode spaced forward from said first named electrode, means to maintain a corona discharge at the termination of said first named electrode and means for supplying a secondary gas to said atomizing nozzle to carry atomized coating material to objects to be coated.

4. Coating apparatus comprising in combination means to disperse finely divided coating material in a gas stream, a substantially annular electrode, a rod electrode of relatively small diameter positioned substantially coaxially with respect to said annular electrode, said annular electrode being spaced forward from said rod electrode, means to maintain a corona discharge at the terminal point of said rod electrode and means to pass said gas stream carrying finely dispersed coating material through said corona discharge.

JOSEPH A. CAMPBELL, Jr.